(12) United States Patent
Yamanaka et al.

(10) Patent No.: US 10,601,059 B2
(45) Date of Patent: Mar. 24, 2020

(54) FUEL CELL SYSTEM HAVING IMPROVED TIMING CONTROL AND VEHICLE UTILIZING THE SAME

(71) Applicant: TOYOTA JIDOSHA KABUSHIKI KAISHA, Toyota-shi, Aichi-ken (JP)

(72) Inventors: Tomio Yamanaka, Nagoya (JP); Tomotaka Ishikawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/652,292

(22) Filed: Jul. 18, 2017

(65) Prior Publication Data
US 2018/0026286 A1 Jan. 25, 2018

(30) Foreign Application Priority Data
Jul. 21, 2016 (JP) .................. 2016-143402

(51) Int. Cl.
| | |
|---|---|
| *H01M 8/04313* | (2016.01) |
| *H01M 8/04664* | (2016.01) |
| *H01M 8/0438* | (2016.01) |
| *H01M 8/04537* | (2016.01) |
| *H01M 8/04089* | (2016.01) |
| *H01M 8/04111* | (2016.01) |
| *H01M 8/04746* | (2016.01) |
| *H01M 8/1018* | (2016.01) |

(52) U.S. Cl.
CPC ... *H01M 8/04671* (2013.01); *H01M 8/04089* (2013.01); *H01M 8/04111* (2013.01); *H01M 8/04388* (2013.01); *H01M 8/04395* (2013.01); *H01M 8/04552* (2013.01); *H01M 8/04559* (2013.01); *H01M 8/04679* (2013.01); *H01M 8/04753* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 2007/0207355 A1* | 9/2007 | Yoshida | ............ | H01M 8/04097 429/444 |
| 2009/0239105 A1* | 9/2009 | Yoshida | ............ | H01M 8/04432 429/424 |

(Continued)

FOREIGN PATENT DOCUMENTS

JP 2009110806 A 5/2009

*Primary Examiner* — Lucas J. O'Donnell
(74) *Attorney, Agent, or Firm* — Dickinson Wright PLLC

(57) ABSTRACT

A fuel cell system comprises: a fuel gas supplier: an air supplier; an air flow rate acquirer that obtains a flow rate of the air that is supplied to a fuel cell; a voltage acquirer that obtains an output voltage of the fuel cell; and a controller. At the time of starting the fuel cell system, the controller controls the fuel gas supplier to supply a fuel gas to the fuel cell for a first time period. After elapse of the first time period, the controller controls the air supplier to start supply of the air. The controller calculates an integrated value of the flow rate for a second time period after the supply of the air is started. When the integrated value becomes greater than a predetermined amount and the output voltage is less than a predetermined voltage, the controller determines that the fuel cell system has an abnormality.

8 Claims, 5 Drawing Sheets

(56) References Cited

U.S. PATENT DOCUMENTS

2010/0159342 A1\* 6/2010 Imanishi ............ H01M 8/04089
                                                        429/444
2010/0261080 A1  10/2010 Kanie
2010/0273071 A1\* 10/2010 Yoshida ............ H01M 8/04089
                                                        429/431
2011/0274998 A1\* 11/2011 Ichikawa .......... H01M 8/04388
                                                        429/446
2012/0015268 A1\*  1/2012 Yoshida ............ H01M 8/04223
                                                        429/429

\* cited by examiner

FUEL CELL SYSTEM HAVING IMPROVED TIMING CONTROL AND VEHICLE UTILIZING THE SAME

CROSS-REFERENCE TO RELATED APPLICATIONS

The present application claims priority from Japanese patent application 2016-143402 filed on Jul. 21, 2016, the entirety of the content of which is hereby incorporated by reference into this application.

BACKGROUND

Field

The present disclosure relates to a fuel cell system and a vehicle.

Related Art

A prior art fuel cell system is configured to supply hydrogen and the air to a fuel cell stack at the time of starting the fuel cell system, to measure an output voltage of the fuel cell stack when the respective flow rates of hydrogen and the air reach predetermined flow rates, and to determine whether the fuel cell stack has an abnormality, based on the measured output voltage (for example, as described in JP 2009-110806A).

In this fuel cell system, the flow rate of the air is likely to be not sufficiently increased, due to various reasons. For example, on a cold start, actuation of an air compressor is suppressed for the purpose of protection of a battery that is used as the driving source to start the air compressor. This provides an insufficient flow rate of the air. In another example, when a friction is generated in the air compressor, this also provides an insufficient flow rate of the air. When the flow rate of the air is not sufficiently increased, the above prior art fuel cell system fails to determine whether the fuel cell stack has an abnormality since the flow rate of the air does not reach the predetermined flow rate. There is accordingly a demand for a technique that allows the fuel cell system to determine whether the fuel cell system has an abnormality even when the flow rate of the air is not sufficiently increased.

SUMMARY

According to one aspect of the disclosure, there is provided a fuel cell system. The fuel cell system, comprises: a fuel cell configured to generate electric power by a reaction of a fuel gas and the air; a fuel gas supplier configured to supply the fuel gas to the fuel cell; an air supplier configured to supply the air to the fuel cell; an air flow rate acquirer configured to obtain a flow rate of the air that is to be supplied to the fuel cell; a voltage acquirer configured to obtain an output voltage of the fuel cell; and a controller configured to control the fuel gas supplier and the air supplier. The controller is configured to control the fuel gas supplier to supply the fuel gas to the fuel cell for a first time period until completion of supply of the fuel gas to the fuel cell is estimated, at time of starting the fuel cell system, control the air supplier to start supply of the air, after elapse of the first time period, calculate an integrated value of the flow rate obtained by the air flow rate acquirer for a predetermined second time period after the supply of the air is started, and determine that the fuel cell system has an abnormality, in case where the calculated integrated value becomes greater than a predetermined amount of the air and the output voltage obtained by the voltage acquirer is less than a predetermined voltage.

DETAILED DESCRIPTION

A. Configuration of Fuel Cell System

Figure 1:
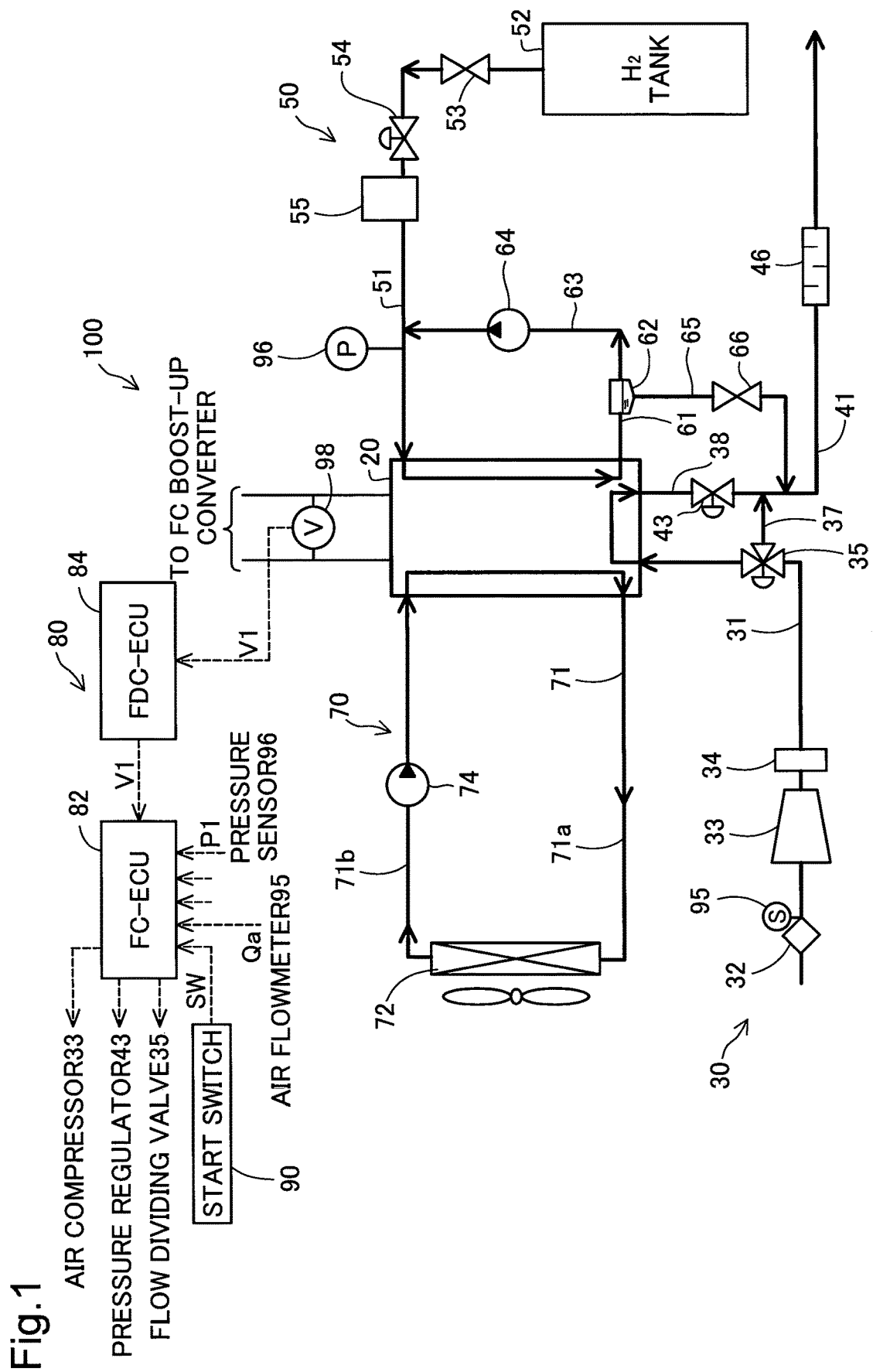
FIG. 1 is a diagram illustrating the flow path configuration of a fuel cell system according to one embodiment of the disclosure.

FIG. 1 is a diagram illustrating the flow path configuration of a fuel cell system 100 according to one embodiment of the disclosure. The fuel cell system 100 is mounted on a fuel cell vehicle and is configured to output a power used as the driving force, in response to the driver's request. The fuel cell vehicle may be, for example, a four-wheel vehicle. The fuel cell system 100 includes a fuel cell stack 20, an air supply discharge portion 30, a hydrogen gas supply discharge portion 50, a cooling medium circulation portion 70, a controller 80 and a start switch 90. The fuel cell vehicle includes a battery (not shown in FIG. 1) in addition to the fuel cell stack 20, as the power source. The battery is an auxiliary power source and is used to, for example, start the fuel cell stack 20.

The fuel cell stack 20 is a unit configured to generate electric power by an electrochemical reaction of a fuel gas (hydrogen gas) and an oxidizing gas (the air) and is formed by stacking a plurality of unit cells. Each unit cell is a power generation element that is capable of generating electric power alone. Each unit cell includes a membrane electrode assembly configured as a power generation body by placing electrodes (cathode and anode) on respective surfaces of an electrolyte membrane, and separators placed on respective outer sides of the membrane electrode assembly. The electrolyte membrane is formed from a solid polymer thin film that provides good proton conductivity in the wet state including water content. The fuel cell stack 20 may be any of various types of fuel cells and is a polymer electrolyte fuel cell according to this embodiment. The fuel cell stack 20 corresponds to the "fuel cell" according to one aspect of the disclosure.

The air supply discharge portion 30 serves to supply the air as the oxidizing gas to the fuel cell stack 20 and also serves to discharge drained water and a cathode off-gas from the cathode side of the fuel cell stack 20 out of the fuel cell system 100. The air supply discharge portion 30 includes air supply piping 31, an air cleaner 32, an air compressor 33, an intercooler 34 configured to decrease the temperature of the intake air increased by supercharging, a flow dividing valve 35, and air flow dividing piping 37, which are all provided on the upstream side of the fuel cell stack 20.

The air supply piping 31 is a pipe connected with a cathode-side inlet of the fuel cell stack 20. The air cleaner 32, the air compressor 33, the intercooler 34, and the flow dividing valve 35 are provided in this sequence from its intake port side configured to take in the ambient air toward downstream in the air supply piping 31.

The air cleaner 32 is provided on the intake port side in the air supply piping 31 and is configured to clean the intake air. An air flowmeter 95 is provided in the vicinity of the air cleaner 32 and is configured to measure the flow rate of the air that passes through the air cleaner 32. The air compressor 33 is configured to compress the intake air and supply the compressed air to the cathode side of the fuel cell stack 20. The intercooler 34 is configured to decrease the temperature of the intake air increased by the air compressor 33.

The flow dividing valve 35 is provided between the intercooler 34 and the fuel cell stack 20 and is configured to divide the flow of the air compressed by the air compressor 33 and cooled down by the intercooler 34 into a flow toward the fuel cell stack 20 and a flow toward cathode off-gas piping 41 (described later) via the air flow dividing piping 37.

The air supply discharge portion 30 also includes cathode off-gas piping 41, a pressure regulator 43 and a muffler 46, which are all provided on the downstream side of the fuel cell stack 20. The cathode off-gas piping 41 is a pipe connected with a cathode-side outlet of the fuel cell stack 20 and arranged to discharge the drained water and the cathode off-gas out of the fuel cell system 100.

The pressure regulator 43 is provided in the cathode off-gas piping 41 and is configured to regulate the pressure of the cathode off-gas (i.e., back pressure on the cathode side of the fuel cell stack 20). A flow-dividing destination port of the air flow dividing piping 37 is connected with the downstream side of the pressure regulator 43 in the cathode off-gas piping 41. The air supply discharge portion 30 of this configuration corresponds to the "air supply portion" according to one aspect of the disclosure.

The hydrogen gas supply discharge portion 50 serves to supply the hydrogen gas to the fuel cell stack 20, also serves to discharge an anode off-gas from the fuel cell stack 20 out of the fuel cell system 100, and additionally serves to circulate the anode off-gas in the fuel cell system 100. The hydrogen gas supply discharge portion 50 includes hydrogen gas supply piping 51 and a hydrogen tank 52, which are both provided on the upstream side of the fuel cell stack 20. The hydrogen tank 52 is filled with high-pressure hydrogen, which is to be supplied to the fuel cell stack 20. The hydrogen tank 52 is connected with an anode-side inlet of the fuel cell stack 20 via the hydrogen gas supply piping 51.

An on-off valve 53, a regulator 54 and a hydrogen supply device 55 are also provided in this sequence from its upstream side (hydrogen tank 52-side) in the hydrogen gas supply piping 51. The on-off valve 53 is configured to regulate the inflow of hydrogen from the hydrogen tank 52 to the hydrogen supply device 55. The regulator 54 is a pressure reducing valve configured to regulate the pressure of hydrogen on the upstream side of the hydrogen supply device 55. The hydrogen supply device 55 may be configured by, for example, an injector that is a solenoid-driven on-off valve.

The hydrogen gas supply discharge portion 50 also includes anode off-gas piping 61, a gas liquid separator 62, hydrogen gas circulation piping 63, a hydrogen circulation pump 64, anode water drainage piping 65, and a drain valve 66, which are all provided on the downstream side of the fuel cell stack 20. The anode off-gas piping 61 is a pipe arranged to connect an anode-side outlet of the fuel cell stack 20 with the gas liquid separator 62.

The gas liquid separator 62 is connected with the hydrogen gas circulation piping 63 and with the anode water drainage piping 65. The anode off-gas flowing through the anode off-gas piping 61 into the gas liquid separator 62 is subjected to separation of a gas component from water by the gas liquid separator 62. The gas liquid separator 62 is configured to introduce the gas component of the anode-off gas to the hydrogen gas circulation piping 63 and introduce the water to the anode water drainage piping 65.

The hydrogen gas circulation piping 63 is connected with the downstream side of the hydrogen supply device 55 in the hydrogen gas supply piping 51. The hydrogen gas circulation piping 63 is provided with the hydrogen circulation pump 64. The hydrogen circulation pump 64 serves as a circulation pump to feed hydrogen included in the gas component separated by the gas liquid separator 62 to the hydrogen gas supply piping 51.

A pressure sensor 96 is provided on the downstream side of the joint between the hydrogen gas circulation piping 63 with the hydrogen gas supply piping 51. The pressure sensor 96 is configured to detect a pressure P1 of the hydrogen gas that is to be supplied to the fuel cell stack 20.

The anode water drainage piping 65 is provided with the drain valve 66. The drain valve 66 is opened and closed in response to an instruction from the controller 80. The controller 80 is configured to generally close the drain valve 66 and open the drain valve 66 at a predetermined water drainage timing and at a discharge timing of an inert gas included in the anode off-gas. A downstream end of the anode water drainage piping 65 joins with the cathode off-gas piping 41 such that the anode-side drained water and the anode off-gas are mixed with the cathode-side drained water and the cathode-off gas to be discharged. The hydrogen gas supply discharge portion 50 of this configuration corresponds to the "fuel gas supply portion" according to one aspect of the disclosure.

The cooling medium circulation portion 70 includes cooling medium piping 71, a radiator 72 and a circulation pump 74. The cooling medium piping 71 is a pipe arranged to circulate a cooling medium that is used to cool down the fuel cell stack 20 and includes an upstream-side pipe 71a and a downstream-side pipe 71b. The upstream-side pipe 71a is arranged to connect an outlet of a cooling medium flow path in the fuel cell stack 20 with an inlet of the radiator 72. The downstream-side pipe 71b is arranged to connect an inlet of the cooling medium flow path in the fuel cell stack 20 with an outlet of the radiator 72.

The radiator 72 includes a fan provided to take in the ambient air and is configured to cool down the cooling medium by heat exchange between the cooling medium in the cooling medium piping 71 and the ambient air. The circulation pump 74 is provided in the downstream-side pipe 71b. The cooling medium is flowed in the cooling medium piping 71 by the driving force of the circulation pump 74.

The controller 80 may be implemented by a microcomputer including a central processing unit (CPU) and a storage device and is configured to provide various functions by loading and executing programs on the storage device. The controller 80 includes an FC-ECU 82 and an FDC-ECU 84. The FC-ECU 82 is configured to control the respective components of the air supply discharge portion 30, the hydrogen gas supply discharge portion 50 and the cooling medium circulation portion 70 described above, such as to perform supply controls of the hydrogen gas and the air to the fuel cell stack 20, water drainage control from the fuel cell stack 20, and cooling control of exhaust heat generated in the fuel cell stack 20. The FDC-ECU 84 is configured to control an FC boost-up converter (not shown) provided to boost up an output voltage from the fuel cell stack 20, such as to cause the fuel cell stack 20 to generate an electric power corresponding to an output request.

Various sensors included in the air supply discharge portion 30, the hydrogen gas supply discharge portion 50 and the cooling medium circulation portion 70, for example, the air flowmeter 50 and the pressure sensor 96 provided in the hydrogen gas supply discharge portion 50, are electrically connected with the FC-ECU 82. The FC-ECU 82 is configured to obtain an air flow rate Qa detected by the air flowmeter 95 and the pressure P1 of the hydrogen gas that is to be supplied to the fuel cell stack 20.

The FC-ECU 82 and the FDC-ECU 84 communicate with each other via a bus according to a communication protocol such as CAN. For example, the FC-ECU 82 obtains a voltage detection signal V1 from the FDC-ECU 84 by communication. A voltage sensor 98 is provided between the fuel cell stack 20 and the FC boost-up converter (not shown) and is configured to detect a voltage output from the fuel cell stack 20. The voltage detection signal V1 output from the voltage sensor 98 is sent to the FDC-ECU 84. The FDC-ECU 84 then sends this voltage detection signal V1 to the FC-ECU 82. The FC-ECU 82 corresponds to the "controller" according to one aspect of the disclosure. The voltage sensor 98 and the FDC-ECU 84 correspond to the "voltage acquirer" according to one aspect of the disclosure.

The start switch 90 is a start-up switch of the vehicle operated by the driver. An ON operation of the start switch 90 starts the fuel cell system 100 mounted on the vehicle. An OFF operation of the start switch 90 stops the fuel cell system 100. More specifically, when the start switch 90 is changed to an ON position, the start switch 90 outputs a signal SW (="1") indicating that the fuel cell system 100 is to be started. When the start switch 90 is changed to an OFF position, the start switch 90 outputs the signal SW (="0") indicating that the fuel cell system 100 is to be stopped. The start switch 90 is connected with the controller 80. More specifically, the start switch 90 is connected with the FC-ECU 82.

B. Fuel Cell System Start-Up Process

Figure 2:
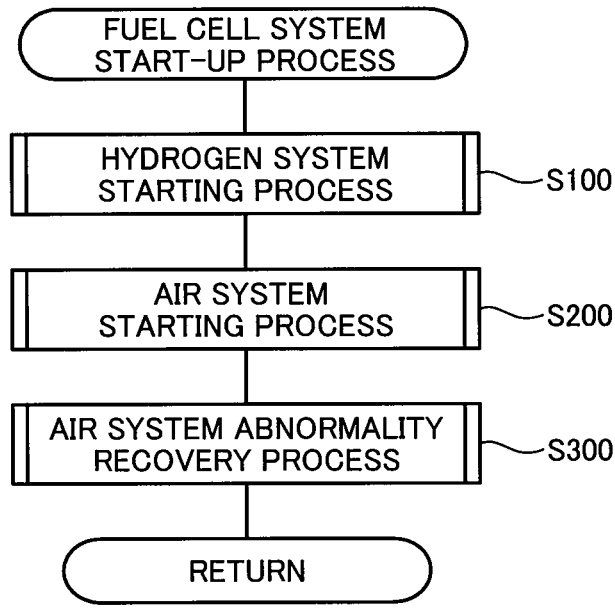
FIG. 2 is a flowchart showing a fuel cell system start-up process performed by an FC-ECU.

FIG. 2 is a flowchart showing a fuel cell system start-up process performed by the FC-ECU 82. The fuel cell system start-up process is a process of starting the fuel cell system 100 and is triggered when the signal indicating that the fuel cell system 100 is to be started is obtained from the start switch 90, i.e., when the signal SW obtained from the start switch 90 is changed from the OFF position (="0") to the ON position (="1").

The FC-ECU 82 first performs a hydrogen system starting process to start up the hydrogen gas supply discharge portion 50 (step S100). On completion of the hydrogen system starting process, the FC-ECU 82 subsequently performs an air system starting process to start up the air supply discharge portion 30 (step S200). On completion of the air system starting process, the FC-ECU 82 subsequently performs an air system abnormality recovery process (step S300). After performing step S300, the FC-ECU 82 terminates this fuel cell system start-up process. The electric power required for the fuel cell system start-up process is supplied by a battery (not shown).

Figure 3:
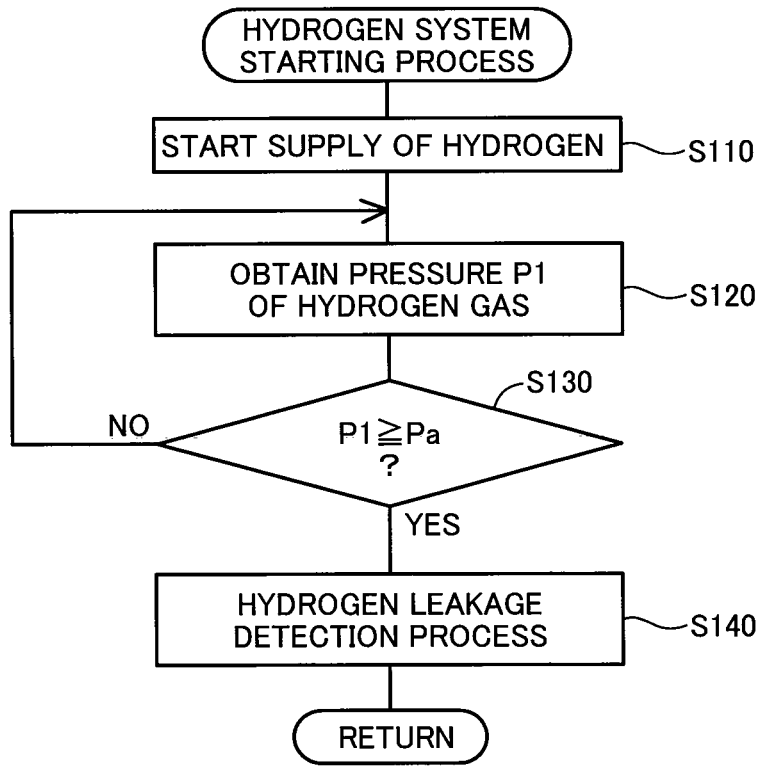
FIG. 3 is a flowchart showing the details of a hydrogen system starting process.

FIG. 3 is a flowchart showing the details of the hydrogen system starting process performed at step S100. When the hydrogen system starting process is triggered, the FC-ECU 82 first starts supply of hydrogen in the hydrogen gas supply discharge portion 50 (step S110). More specifically, the FC-ECU 82 opens the regulator 54 and drives the hydrogen supply device 55, while driving the hydrogen circulation pump 64, so as to start supply of hydrogen to the fuel cell stack 20.

The FC-ECU 82 subsequently obtains the pressure P1 of the hydrogen gas that is to be supplied to the fuel cell stack 20, from the pressure sensor 96 provided in the hydrogen gas supply discharge portion 50 (step S120) and determines whether the obtained pressure P1 becomes equal to or higher than a predetermined value Pa (step S130). The predetermined value Pa is a reference value determined in advance and used to estimate that supply of the hydrogen gas to the fuel cell stack 20 is completed. More specifically, when it is determined at step S130 that the pressure P1 of the hydrogen gas does not become equal to or higher than the predetermined value Pa, the FC-ECU 82 determines that the supply of the fuel gas to the fuel cell stack 20 is not completed. When it is determined at step S130 that the pressure P1 of the hydrogen gas becomes equal to or higher than the predetermined value Pa, on the other hand, the FC-ECU 82 determines that the supply of the fuel gas to the fuel cell stack 20 is completed. The state that the supply of the fuel gas is completed" denotes the state that a hydrogen gas flow path provided inside of the fuel cell stack 20 is sufficiently filled with the hydrogen gas. The predetermined value Pa may be determined experimentally or by simulation.

When it is determined at step S130 that the pressure P1 of the hydrogen gas does not become equal to or higher than the predetermined value Pa, the FC-ECU 82 returns the processing flow to step S120 and waits until the pressure P1 of the hydrogen gas becomes equal to or higher than the predetermined value Pa.

When it is determined at step S130 that the pressure P1 of the hydrogen gas becomes equal to or higher than the predetermined value Pa, on the other hand, the FC-ECU 82 proceeds to step S140 to perform a hydrogen leakage detection process. Any of various methods may be employed for the hydrogen leakage detection process. According to this embodiment, the FC-ECU 82 monitors a decrease in pressure of the hydrogen gas to detect a leakage of the hydrogen gas. This method opens a plurality of shutoff valves (not shown) provided in the hydrogen gas supply discharge portion 50 and performs the processing of steps S110 to S130. After that, this method stops the hydrogen supply device 55, closes all the shut-off valves and monitors a change in pressure detected by the pressure sensor 96 with time elapsed. When a pressure decrease of or over a certain level is observed, the FC-ECU 82 determines that a leakage of the gas occurs. According to a modification, in addition to or in place of detection of a gas leakage based on a pressure change, the occurrence of a gas leakage may be detected by using a gas concentration sensor that is provided to determine whether the concentration of the hydrogen gas becomes equal to or higher than a predetermined reference concentration.

When no hydrogen leakage is detected in the hydrogen leakage detection process at step S140, the FC-ECU 82 goes to "Return" and terminates this hydrogen system starting process. When a hydrogen leakage is detected, on the other hand, the FC-ECU 82 performs an error process provided as a separate routine.

According to this embodiment, the hydrogen system starting process is completed before the air system starting process is triggered. This aims to suppress depletion of hydrogen in the fuel cell stack 20 when supply of the air is started by the air system starting process. Depletion of hydrogen in the process of power generation is likely to cause degradation of a catalyst. This configuration reduces the possibility of such degradation of the catalyst.

Figure 4:
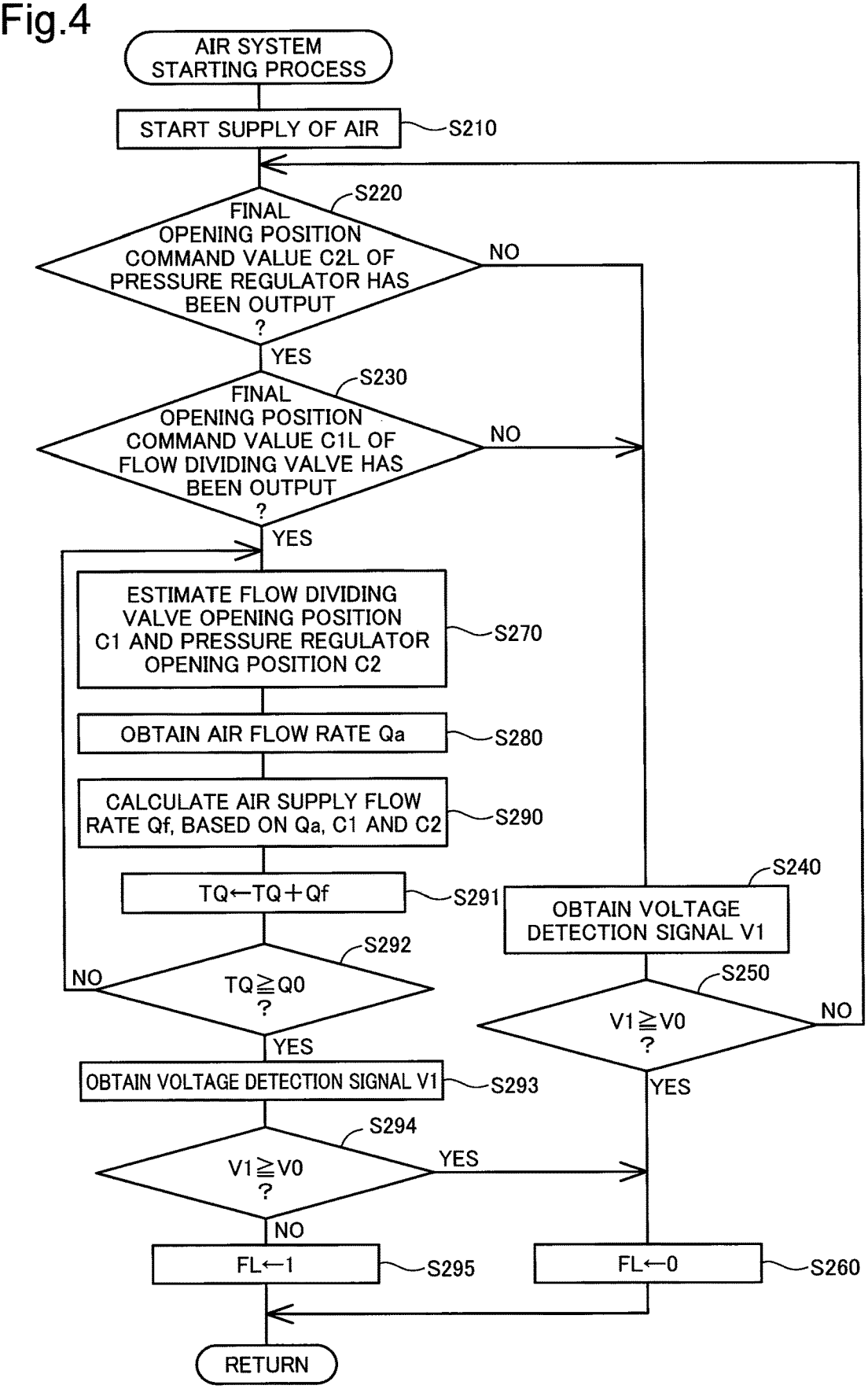
FIG. 4 is a flowchart showing the details of an air system starting process.

FIG. 4 is a flowchart showing the details of the air system starting process performed at step S200 shown in FIG. 2. When the air system starting process is triggered, the FC-ECU 82 first starts supply of the air in the air supply discharge portion 30 (step S210). More specifically, the FC-ECU 82 drives the air compressor 33 to discharge a constant amount of the air, while controlling the pressure regulator 43 and the flow dividing valve 35 to be opened.

Figure 5:
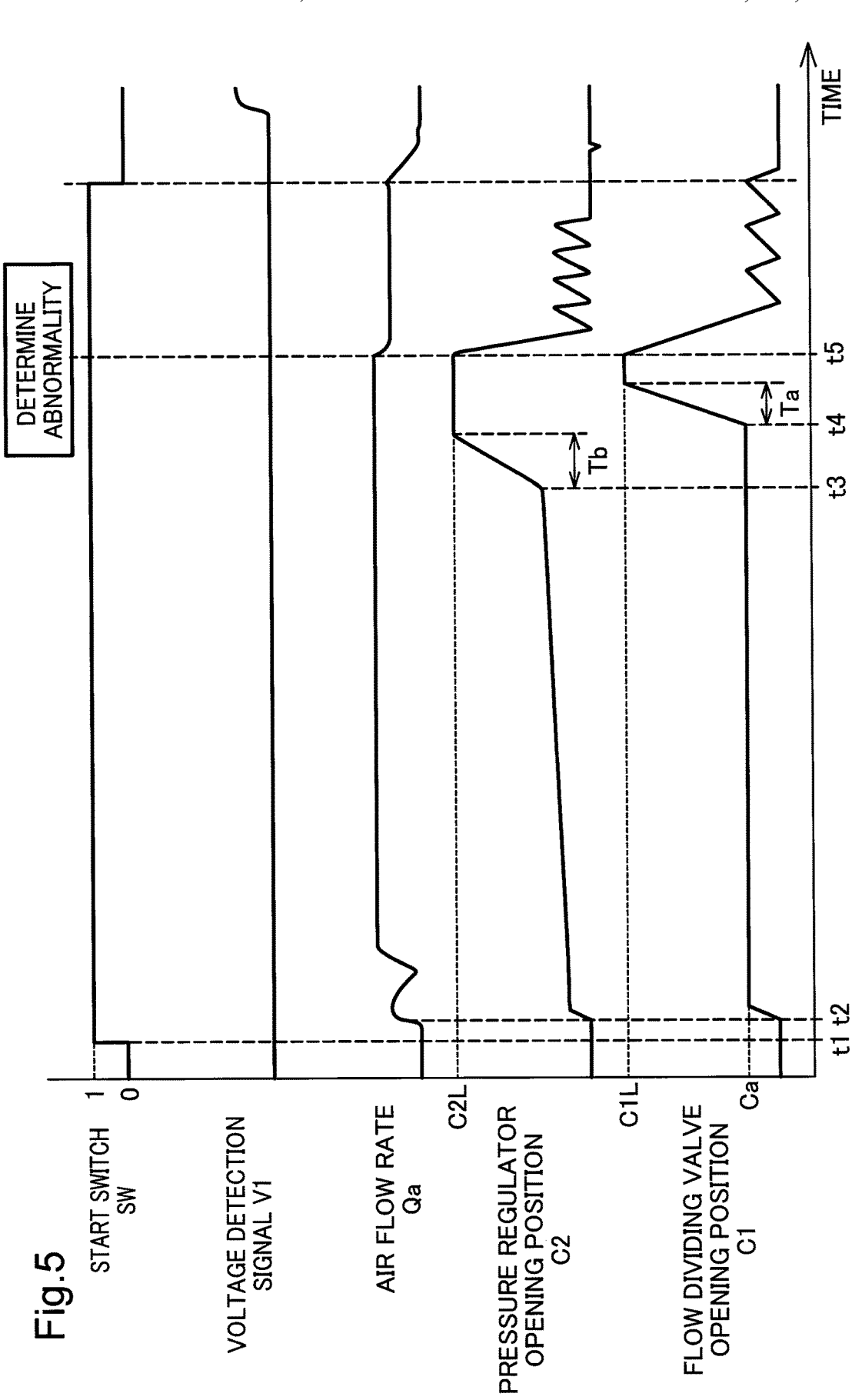
FIG. 5 is a time chart showing time changes in voltage detection signal, air flow rate and the like after a start switch is changed to an ON position.

FIG. 5 is a time chart showing time changes in voltage detection signal V1, air flow rate Qa, flow dividing valve opening position C1 (hereinafter referred to as "FDV opening position C1") and pressure regulator opening position C2 after the start switch 90 is changed to the ON position. The voltage detection signal V1 is detected by the voltage sensor 98 (shown in FIG. 1). The air flow rate Qa is detected by the air flowmeter 95. The FDV opening position C1 denotes a valve opening ratio of the flow dividing valve 35 to a fuel cell stack 20-side port and is determined experimentally or by simulation. The pressure regulator opening position C2 (hereinafter referred to as "PR opening position C2") denotes an opening position of the pressure regulator 43 and is determined experimentally or by simulation.

As shown in FIG. 5, the signal SW of the start switch 90 is changed from the OFF position (="0") to the ON position (="1"). At this time (at a time t1), the hydrogen system starting process is triggered. On completion of the hydrogen system starting process (at a time t2), the air system starting process is triggered. The flow dividing valve 35 and the pressure regulator 43 have been closed at the time of stopping the fuel cell stack 20 during a previous operation of the fuel cell vehicle and are kept closed until the air system starting process is triggered. When the air system starting process is triggered, an area from the flow dividing valve 35 provided in the air supply piping 31, through an air flow path provided inside of the fuel cell stack 20, to the pressure regulator 43 provided in the cathode off-gas piping 41 is in a closed environment. In the description below, the area of the air system in the closed environment is called "air system closed area".

In the air system starting process, the FC-ECU 82 drives the air compressor 33 such as to provide a constant discharge amount of the air and thereby keeps the air flow rate Qa at a constant value. The FC-ECU 82 also controls the flow dividing valve 35 to change the FDV opening position C1 to a fixed value Ca, while controlling the pressure regulator 43 to gradually increase the PR opening position C2.

In the air system starting process, the FC-ECU 82 controls the flow dividing valve 35 and the pressure regulator 43 as described above and respectively controls the flow dividing valve 35 and the pressure regulator 43 to desired opening positions in a final stage. The "final stage" denotes a last phase in the air system starting process that provides final opening position commands and does not allow for any subsequent changes of OP command values in the air system starting process (i.e., keeps the OP command values fixed). The "desired opening positions" denote opening positions required when the processing flow completes the fuel cell system start-up process and shifts to an ordinary driving process and are provided as individual values for the flow dividing valve 35 and the pressure regulator 43.

More specifically, the FC-ECU 82 outputs a final opening position command value C2L (hereinafter referred to as "the final OP command value C2L") to the pressure regulator 43 at a time t3, and outputs a final opening position command value C1L (hereinafter referred to as "the final OP command value C1L") to the flow dividing valve 35 at a time t4. According to this embodiment, the time t3 may be, for example, a timing when the PR opening position C2 becomes equal to or larger than a predetermined value. The time t4 may be, for example, a timing when a time elapsed since the time t1 at which the start switch 90 is changed to the ON position reaches a predetermined value. The times t3 and t4 are, however, not limited to these examples but may be any timings other than these examples as long as the timings are based on a predetermined sequence. Both the final OP command values C1L and C2L may be, for example, 100%. Each of the final OP command values C1L and C2L is, however, not necessarily limited to this example but may be any value that provides an adequate opening position for a shift to the ordinary driving process.

The PR opening position C2 reaches the final OP command value C2L after elapse of a second predetermined time Tb since the time t3. The FC-ECU 82 provides a driving rate along with the final OP command value C2L to the pressure regulator 43. The second predetermined time Tb is determined according to the final OP command value C2L and the driving rate. The FC-ECU 82 does not provide a command to change the opening position of the pressure regulator 43 until the air system starting process is completed after the time t3.

The FDV opening position C1 reaches the final OP command value C1L after elapse of a first predetermined time Ta since the time t4. The FC-ECU 82 provides a driving rate along with the final OP command value C1L to the flow dividing valve 35. The first predetermined time Ta is determined according to the final OP command value C1L and the driving rate. The FC-ECU 82 does not provide a command to change the opening position of the flow dividing valve 35 until the air system starting process is completed after the time t4.

After the final OP command values C1L and C2L have been output to the flow dividing valve 35 and the pressure regulator 43, the opening position command values are kept unchanged as described above. Additionally, the air compressor 33 is controlled to provide the constant discharge amount of the air. The supply amount of the air to the fuel cell stack 20 is thus not significantly changed until the air system starting process is terminated. In other words, the supply amount of the air is kept substantially stable. The time period after the final OP command values C1L and C2L are respectively output to the flow dividing valve 35 and to the pressure regulator 43 corresponds to the "second time period" according to one aspect of the disclosure.

Referring back to FIG. 4, at step S220 subsequent to step S210, the FC-ECU 82 determines whether the final OP command value C2L of the pressure regulator 43 described above has been output. At subsequent step S230, the FC-ECU 82 determines whether the final OP command value C1L of the flow dividing valve 35 described above has been output. When it is determined at either step S220 or step S230 that the final OP command value C1L or C2L has not yet been output, the FC-ECU 82 obtains the voltage detection signal V1 from the FDC-ECU 84 (step S240) and determines whether the output voltage of the fuel cell stack 20 represented by the obtained voltage detection signal V1 is equal to or higher than a predetermined value V0 (step S250).

The predetermined value V0 is a reference value used for a diagnosis that the fuel cell stack 20 provides normal power generation and may be, for example, a value obtained by multiplying 0.6 V by the number of unit cells constituting the fuel cell stack 20. At step S250, the FC-ECU 82 determines whether the output voltage of the fuel cell stack 20 represented by the obtained voltage detection signal V1 becomes equal to or higher than the voltage corresponding to 0.6 V per unit cell and thereby determines whether the fuel cell stack 20 provides normal power generation. In the case of a negative answer at step S250, i.e., when it is determined that the output voltage of the fuel cell stack 20 represented by the voltage detection signal V1 is lower than the predetermined value V0, the FC-ECU 82 returns the processing flow to step S220 and repeats the processing of and after step S220.

In the case of an affirmative answer at step S250, i.e., when it is determined that the output voltage of the fuel cell stack 20 represented by the voltage detection signal V1 is equal to or higher than the predetermined value V0, on the other hand, the FC-ECU 82 determines that the fuel cell stack 20 has successfully been started up and sets a value "0" indicating normality to an air system abnormality diagnostic flag FL (step S260). After performing step S260, the FC-ECU 82 goes to "Return" and terminates the air system starting process. The air system abnormality diagnostic flag FL (hereinafter referred to as "AS abnormality diagnostic flag FL") denotes a flag used to store an abnormality of the fuel cell stack 20 or more specifically an abnormality of the air system.

When it is determined at both steps S220 and S230 that the final OP command values C1L and C2L have been output, the FC-ECU 82 proceeds to step S270 to estimate the FDV opening position C1 and the PR opening position C2 at the current moment. More specifically, the FC-ECU 82 calculates the FDV opening position C1 at the current moment, based on the driving rate provided along with the final OP command value C1L to the flow dividing valve 35 and an elapsed time measured by a timer (not shown) as a time period elapsed since the final OP command value C1L of the flow dividing valve 35 has been output. The FC-ECU 82 also calculates the PR opening position C2 at the current moment, based on the driving rate provided along with the final OP command value C2L to the pressure regulator 43 and an elapsed time measured by a timer (not shown) as a time period elapsed since the final OP command value C2L of the pressure regulator 43 has been output.

The FC-ECU 82 subsequently obtains the air flow rate Qa detected by the air flowmeter 95 (step S280) and calculates a flow rate Qf of the air that is to be supplied to the fuel cell stack 20 (hereinafter referred to as "air supply flow rate Qf"), based on the obtained air flow rate Qa and the FDV opening position C1 and the PR opening position C2 estimated at step S270 (step S290). More specifically, the FC-ECU 82 calculates the air supply flow rate Qf from the air flow rate Qa, the FDV opening position C1 and the PR opening position C2 by processes (i) and (ii) described below:

(i) The FC-ECU 82 calculates a ratio R1 of the air that is to be divided and supplied to the fuel cell stack 20-side port by the flow dividing valve 35, based on the FDV opening position C1 and the PR opening position C2 estimated at step S270. The ratio R1 of the air denotes a ratio to the total amount of the intake air; and (ii) The FC-ECU 82 calculates the air supply flow rate Qf of the air that is to be supplied to the fuel cell stack 20 by multiplying the air flow rate Qa detected by the air flowmeter 95 by the calculated ratio R1 of the air.

The air flowmeter 95 and the processing of steps S270 to S290 performed by the FC-ECU 82 constitute the "air flow rate acquirer" according to one aspect of the disclosure. The FC-ECU 82 subsequently performs an operation of integrating the air supply flow rate Qf calculated at step S290 (step S291). More specifically, the FC-ECU 82 integrates the air supply flow rate Qf according to Equation (1) given below:

$$TQ \leftarrow TQ+Qf \qquad (1)$$

An integrated value TQ is a variable that is cleared to the value "0" when the fuel cell system start-up process is triggered.

After performing step S291, the FC-ECU 82 determines whether the integrated value TQ is equal to or greater than a predetermined value Q0 (step S292). The predetermined value Q0 denotes an amount of the air determined in advance and is set to the sum of (i) the volume of the air supply piping 31 from the flow dividing valve 35 to the fuel cell stack 20, (ii) the volume of the air flow path formed inside of the fuel cell stack 20 and (iii) the volume of the cathode off-gas piping 41 from the fuel cell stack 20 to the pressure regulator 43. Accordingly, the total volume of the air system closed area described above is set to the predetermined value Q0.

In the case of a negative answer at step S292, i.e., when it is determined that the integrated value TQ is less than the predetermined value Q0, the FC-ECU 82 returns the processing flow to step S270 and repeats the processing of and after step S270. In other words, the FC-ECU 82 integrates the air supply flow rate Qf until the integrated value TQ becomes equal to or greater than the predetermined value Q0.

In the case of an affirmative answer at step S292, i.e., when it is determined that the integrated value TQ is equal to or greater than the predetermined value Q0, on the other hand, the FC-ECU 82 determines that the air system closed area described above is filled with the air and proceeds to step S293. At step S293, the FC-ECU 82 obtains the voltage detection signal V1 from the FDC-ECU 84. The FC-ECU 82 subsequently determines whether the output voltage of the fuel cell stack 20 represented by the obtained voltage detection signal V1 is equal to or higher than the predetermined value V0 (step S294). The processing of steps S293 and S94 is identical with the processing of steps S240 and S250.

In the case of an affirmative answer at step S294, i.e., when it is determined that the output voltage of the fuel cell stack 20 represented by the voltage detection signal V1 is equal to or higher than the predetermined value V0, the FC-ECU 82 determines that the fuel cell stack has successfully been started up and proceeds to step S260 to set the value "0" indicating normality to the AS abnormality diagnostic flag FL. After performing step S260, the FC-ECU 82 goes to "Return" and terminates the air system starting process.

In the case of a negative answer at step S294, i.e., when it is determined that the output voltage of the fuel cell stack 20 represented by the voltage detection signal V1 is lower than the predetermined value V0, on the other hand, the FC-ECU 82 determines that the fuel cell stack 20 does not provide normal power generation (i.e., the fuel cell stack 20 has an abnormality) and sets a value "1" indicating an abnormality to the AS abnormality diagnostic flag FL (step S295). In the illustrated example of FIG. 5, a time t5 is a timing when it is diagnosed that the fuel cell stack 20 does not provide normal power generation. After performing step S295 of FIG. 4, the FC-ECU 82 goes to "Return" and terminates the air system starting process.

Figure 6:
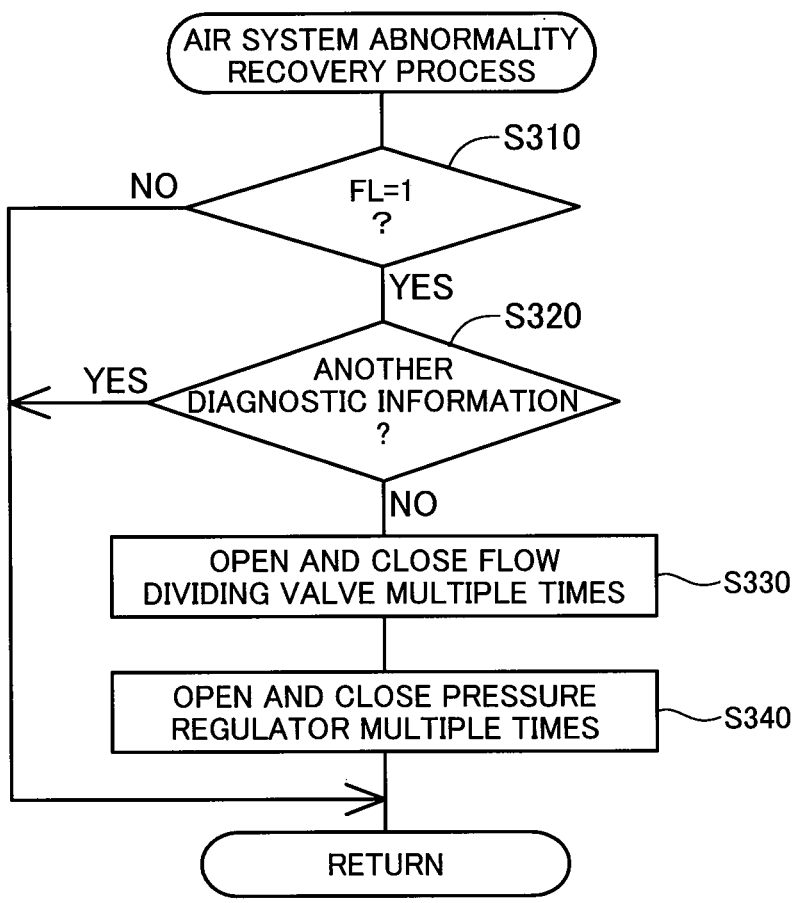
FIG. 6 is a flowchart showing the details of an air system abnormality recovery process.

FIG. 6 is a flowchart showing the details of the air system abnormality recovery process performed at step S300. When the air system abnormality recovery process is triggered, the FC-ECU 82 first determines whether the AS abnormality diagnostic flag FL obtained in the air system starting process described above is equal to "1" (step S310). When it is determined that the AS abnormality diagnostic flag FL is not equal to "1", the FC-ECU 82 goes to "Return" and terminates the air system abnormality recovery process.

When it is determined at step S310 that the AS abnormality diagnostic flag FL is equal to "1", on the other hand, the FC-ECU 82 determines whether there is another diagnostic information (step S320). Another diagnostic information is diagnostic information other than the AS abnormality diagnostic flag FL and may be, for example, air compressor abnormality diagnostic information, sensor abnormality diagnostic information or hydrogen system abnormality diagnostic information. When it is determined that there is no other diagnostic information, the cause of the setting of the AS abnormality diagnostic flag FL to "1" may be attributed to the flow dividing valve 35 or the pressure regulator 43 serving as the control valve. The FC-ECU 82 accordingly proceeds to step S330.

At step S330, the FC-ECU 82 performs an operation of opening and closing the flow dividing valve 35 multiple times (for example, three times). At subsequent step S340, the FC-ECU 82 performs an operation of opening and closing the pressure regulator 43 multiple times (for example, four times).

The control valve such as the flow dividing valve 35 or the pressure regulator 43 includes a rubber sealing portion to ensure the sealing performance. Adhesion of this rubber sealing portion to a valve seat is likely to cause an opening failure of the valve. This is a major cause of diagnosis that the control valve is abnormal. Accordingly the operation of opening the valve to such an opening position that certainly separates the rubber sealing portion from the valve seat and subsequently closing the valve is repeated multiple times. The opening and closing operations of step S330 or step S340 enable the sealing portion to be separated from the valve seat and thereby provide recovery from an opening failure of the control valve. The number of repetitions is set to three times (or four times) as described above according to this embodiment but is not necessarily limited to three times (or four times). The number of repetitions may be set to any other multiple number of times.

The opening and closing operations of step S330 or step S340 decrease the driving rate to maximize the driving force of the control valve and subsequently maximize the driving voltage. For convenience of illustration, the operation of step S340 is shown after the operation of step S330. In the actual state, however, the operation of opening and closing the flow dividing valve 35 at step S330 and the operation of opening and closing the pressure regulator 43 at step S340 are performed in parallel to each other.

In the illustrated example of FIG. 5, the FDV opening position C1 and the PR opening position C2 repeat decreasing and increasing multiple times by performing the opening and closing operations of steps S330 and S340 after the time t5. After performing step S340 in FIG. 6, the FC-ECU 82 goes to "Return" and terminates the air system abnormality recovery process. When it is determined at step S320 that there is another diagnostic information, the FC-ECU 82 goes to "Return" without performing steps S330 and S340 and terminates the air system abnormality recovery process.

C. Functions and Advantageous Effects of Embodiment

The fuel cell system 100 of the embodiment having the above configuration performs the hydrogen system starting process at the time of starting the fuel cell stack 20 and activates the air compressor 33 to start supply of the air after completion of the hydrogen system starting process. The fuel cell system 100 subsequently calculates the integrated value TQ of the air supply flow rate Qf of the air that is to be supplied to the fuel cell stack 20. When the calculated integrated value TQ becomes greater than the predetermined value Q0, the fuel cell system 100 performs determination of an abnormality of the fuel cell system 100, based on the voltage detection signal V1 of the fuel cell stack 20. The fuel cell system 100 can thus determine whether a sufficient amount of the air has been supplied to the fuel cell stack 20, based on the integrated value TQ, even when the flow rate of the air is not sufficiently increased, for example, due to suppression of actuation of the air compressor 33 for the purpose of protecting the battery on a cold start or due to a friction generated in the air compressor 33. Accordingly, the fuel cell system 100 of this configuration can determine whether the fuel cell system 100 has an abnormality even when the flow rate of the air is not sufficiently increased.

The fuel cell system 100 of this embodiment calculates the integrated value TQ for a time period when the supply amount of the air to the fuel cell stack 20 is not significantly changed. This configuration enhances the accuracy of determination of an abnormality of the fuel cell system 100.

In the fuel cell system 100 of this embodiment, the predetermined value Q0 that is used as the reference value to be compared with the integrated value TQ is equal to the total volume of the air system closed area. This configuration enables a sufficient amount of the air to be supplied to the air system closed area. Cross leakage, in which hydrogen supplied to the anode crosses over the electrolyte membrane to the cathode side, is likely to occur during a stop of the fuel cell vehicle prior to a start of the fuel cell system 100. Supplying a sufficient amount of the air to the air system closed area as described above enables the cross-leaked hydrogen to be effectively discharged out of the fuel cell stack 20. This configuration accordingly suppresses deterioration of the power generation performance due to such cross leakage.

D. Modifications

Modification 1

According to the above embodiment, the predetermined value Q0 that is used as the reference value to be compared with the integrated value TQ is equal to the total volume of the air system closed area. According to a modification, the predetermined value Q0 may be set to twice or three times the total volume of the air system closed area or may be set to another multiple of the total volume. This multiple may not be necessarily an integral multiple. The predetermined value Q0 may be set to another magnitude that is equal to or greater than the total volume of the air system closed area. According to another modification, the predetermined value Q0 may be set to a smaller value than the total volume of the air system closed area, for example, the sum of the volume of the air supply piping 31 from the flow dividing valve 35 to the fuel cell stack 20 and the volume of the air flow path formed inside of the fuel cell stack 20.

Modification 2

According to the above embodiment, the hydrogen system starting process of FIG. 3 is configured to include the hydrogen leakage detection process. According to a modification, the hydrogen system starting process may be configured to exclude the hydrogen leakage detection process.

Modification 3

According to the above embodiment, the fuel cell system start-up process is configured to include the air system abnormality recovery process. According to a modification, the fuel cell system start-up process may be configured to exclude the air system abnormality recovery process. More specifically, the fuel cell system start-up process may be configured to determine whether the fuel cell stack 20 has an abnormality and store the result of the determination in the AS abnormality diagnostic flag FL but not to perform the recovery process of the control valve.

Modification 4

According to the above embodiment, the hydrogen system starting process of FIG. 3 is configured to determine whether the pressure P1 of the hydrogen gas that is to be supplied to the fuel cell stack 20 is equal to or higher than the predetermined value Pa and thereby determine whether a time period has elapsed until completion of the supply of the hydrogen gas to the fuel cell stack 20 is estimated. According to a modification, the hydrogen system starting process may be configured to determine whether a supply time of the hydrogen gas pressure becomes equal to or longer than a predetermined time period. In other words, any configuration may be employed to determine whether a time period (first time period) has elapsed until completion of the supply of the hydrogen gas to the fuel cell stack 20 is estimated, based on any of various parameters.

Modification 5

According to the above embodiment, the air flowmeter 95 and the processing of steps S270 to S290 performed by the FC-ECU 82 constitute the air flow rate acquirer configured to obtain the flow rate of the air that is to be supplied to the fuel cell. According to a modification, a flow rate sensor may be provided in a division of the air supply piping 31 (shown in FIG. 1) from the flow dividing valve 35 to the inlet of the fuel cell stack 20, and a configuration of obtaining a detection signal of this flow rate sensor may be employed as the air flow rate acquirer.

Modification 6

According to the above embodiment, the air system starting process is configured to calculate the integrated value TQ of the air flow rate for the second time period that is specified as a time period after the final OP command values C1L and C2L have been output to the flow dividing valve 35 and to the pressure regulator 43. According to a modification, the air system starting process may be configured to start the second time period, i.e., to start calculation of the integrated value, before the final OP command values C1L and C2L have been output. For example, the timing when the final OP command values C1L and C2L are certainly output is determined in advance experimentally or by simulation, as an elapsed time since the air system starting process is triggered. The air system starting process may be configured to start the second time period when a shorter time period than the elapsed time by a predetermined time (for example, 10 sec) has elapsed since the air system starting process is triggered. For example, the air system starting process may be configured to start the second time period at a time when valve opening commands are output to the flow dividing valve 35 and to the pressure regulator 43 (at the time t2 in the illustrated example of FIG. 5).

Modification 7

According to the above embodiment, the controller 80 is configured to include the FC-ECU 82 and the FDC-ECU 84, and the FC-ECU 82 is configured to perform the fuel cell system start-up process. According to a modification, the controller 80 may be configured by a single ECU. According to another modification, the controller 80 may be configured by three, four or any other number of ECUs. Additionally, another controller provided in place of the controller 80 may implement the functions of the FC-ECU 82 as part of its functions.

The disclosure is not limited to any of the embodiment and its modifications described above but may be implemented by a diversity of other configurations without departing from the scope of the disclosure. For example, the technical features of any of the embodiment and its modifications may be replaced or combined appropriately, in order to solve part or all of the problems described above or in order to achieve part or all of the advantageous effects described above. The elements other than those described in independent claims among the elements included in each of the embodiment and its modifications described above are additional elements and may be appropriately omitted. The present disclosure may be implemented by aspects described below.

(1) According to one aspect of the disclosure, there is provided a fuel cell system. The fuel cell system, comprises: a fuel cell configured to generate electric power by a reaction of a fuel gas and the air; a fuel gas supplier configured to supply the fuel gas to the fuel cell; an air supplier configured to supply the air to the fuel cell; an air flow rate acquirer configured to obtain a flow rate of the air that is to be supplied to the fuel cell; a voltage acquirer configured to obtain an output voltage of the fuel cell; and a controller configured to control the fuel gas supplier and the air supplier. The controller is configured to control the fuel gas supplier to supply the fuel gas to the fuel cell for a first time period until completion of supply of the fuel gas to the fuel cell is estimated, at time of starting the fuel cell system, control the air supplier to start supply of the air, after elapse of the first time period, calculate an integrated value of the flow rate obtained by the air flow rate acquirer for a predetermined second time period after the supply of the air is started, and determine that the fuel cell system has an abnormality, in case where the calculated integrated value becomes greater than a predetermined amount of the air and the output voltage obtained by the voltage acquirer is less than a predetermined voltage.

At the time of starting the fuel cell system, the fuel cell system of this aspect starts supply of the air to the fuel cell after the fuel gas is supplied to the fuel cell for the first time period until completion of the supply of the fuel gas to the fuel cell is estimated. The fuel cell system subsequently calculates the integrated value of the obtained flow rate of the air for the second time period. When the calculated integrated value becomes greater than the predetermined amount of the air, the fuel cell system determines whether the fuel cell system has an abnormality, based on the output voltage of the fuel cell. The integrated value of the flow rate of the air indicates the total amount of the air supplied to the fuel cell. The integrated value accordingly indicates whether a sufficient amount of the air has been supplied, even when the flow rate that indicates the amount of the air per unit time is not sufficiently increased. The fuel cell system of this aspect can thus determine whether the fuel cell system has an abnormality, even when the flow rate of the air is not sufficiently increased.

(2) In the fuel cell system of the above aspect, the air supplier may comprise an air compressor configured to compress the air and discharge the compressed air; and a control valve configured to control a supply amount of the air to the fuel cell. The controller may be configured to calculate the integrated value for the second time period that is specified as a time period when an amount of the air discharged by the air compressor is constant and a command value given to the control valve is fixed. The fuel cell system of this aspect can calculate the integrated value for a time period when the amount of the air supplied to the fuel cell is not significantly changed, i.e., for a time period when the flow rate of the air is substantially stable. This configuration enhances the accuracy of determination of an abnormality of the fuel cell system.

(3) In the fuel cell system of the above aspect, the controller is configured to open and close the control valve multiple times, when determining that the fuel cell system has an abnormality. The fuel cell system of this aspect provides recovery of the control valve included in the air supplier from an opening failure of the control valve caused by adhesion of a rubber sealing portion of the control valve to a valve seat.

(4) In the fuel cell system of the above aspect, wherein the fuel gas supplier comprises a pressure sensor configured to detect a gas pressure of the fuel gas that is to be supplied to the fuel cell, wherein the controller is configured to determine that the first time period has elapsed, in case where the gas pressure detected by the pressure sensor becomes equal to or higher than a predetermined value. The fuel cell system of this aspect enables a sufficient amount of the fuel gas to be supplied to the fuel cell, before the supply of the air is started. This configuration accordingly suppresses depletion of hydrogen in the fuel cell at the time of starting the supply of the air and thereby suppresses degradation of a catalyst.

(5) In the fuel cell system of the above aspect, the controller is configured to detect a leakage of hydrogen from the fuel gas supplier during a time period after elapse of the first time period and until start of the supply of the air. The fuel cell system of this aspect allows for detection of a leakage of hydrogen from the fuel gas supplier by a simple configuration.

(6) According to another aspect of the disclosure, there is provided a vehicle. This vehicle is equipped with the fuel cell system of any of the above aspects. The vehicle of this aspect can determine whether the fuel cell system has an abnormality, even when the flow rate of the air is not sufficiently increased.

The present disclosure may be implemented by any of various aspects other than the fuel cell system and the vehicle described above, for example, a moving body other than the vehicle, such as a ship or boat or an airplane, equipped with the fuel cell system, a control method of the fuel cell system, a computer program configured to implement the control method and a non-transitory storage medium in which the computer program is stored.

What is claimed is:

1. A fuel cell system, comprising:
   a fuel cell configured to generate electric power by a reaction of a fuel gas and the air;
   a fuel gas supplier configured to supply the fuel gas to the fuel cell;
   an air supplier configured to supply the air to the fuel cell;
   an air flow rate acquirer configured to obtain a flow rate of the air that is to be supplied to the fuel cell;
   a voltage acquirer configured to obtain an output voltage of the fuel cell; and
   a controller programmed to control the fuel gas supplier and the air supplier, to:
      control the fuel gas supplier to supply the fuel gas to the fuel cell for a first time period until completion of supply of the fuel gas to the fuel cell is estimated, at time of starting the fuel cell system,
      control the air supplier to start supply of the air, after elapse of the first time period,
      calculate an integrated value of the flow rate obtained by the air flow rate acquirer for a predetermined second time period after the supply of the air is started,
      determine that the fuel cell system has an abnormality, in case where the calculated integrated value becomes greater than a predetermined amount of the air and the output voltage obtained by the voltage acquirer is less than a predetermined voltage; and
      open and close the control valve multiple times in response to determining that the fuel cell system has an abnormality.

2. The fuel cell system according to claim 1,
   wherein the air supplier comprises:
      an air compressor configured to compress the air and discharge the compressed air; and
      a control valve configured to control a supply amount of the air to the fuel cell, wherein
   the controller is further programmed to calculate the integrated value for the second time period that is specified as a time period when an amount of the air discharged by the air compressor is constant and a command value given to the control valve is fixed.

3. The fuel cell system according to claim 1,
   wherein the fuel gas supplier comprises a pressure sensor configured to detect a gas pressure of the fuel gas that is to be supplied to the fuel cell, wherein
   the controller is further programmed to determine that the first time period has elapsed, in case where the gas pressure detected by the pressure sensor becomes equal to or higher than a predetermined value.

4. The fuel cell system according to claim 1,
   wherein the controller is further programmed to detect a leakage of hydrogen from the fuel gas supplier during a time period after elapse of the first time period and until start of the supply of the air.

5. A vehicle equipped with the fuel cell system according to claim 1.

6. A vehicle equipped with the fuel cell system according to claim 2.

7. A vehicle equipped with the fuel cell system according to claim 3.

8. A vehicle equipped with the fuel cell system according to claim 4.

* * * * *